United States Patent
Lambert et al.

(10) Patent No.: US 12,371,183 B2
(45) Date of Patent: Jul. 29, 2025

(54) FUEL CONDITIONING SYSTEM AND METHOD CONFIGURED TO POWER AN AIRCRAFT TURBINE ENGINE USING FUEL FROM A CRYOGENIC TANK

(71) Applicant: SAFRAN, Paris (FR)

(72) Inventors: Pierre-Alain Marie Cyrille Lambert, Moissy-Cramayel (FR); Samer Maalouf, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/264,559

(22) PCT Filed: Feb. 24, 2022

(86) PCT No.: PCT/EP2022/054594
§ 371 (c)(1),
(2) Date: Aug. 7, 2023

(87) PCT Pub. No.: WO2022/189154
PCT Pub. Date: Sep. 15, 2022

(65) Prior Publication Data
US 2024/0043135 A1    Feb. 8, 2024

(30) Foreign Application Priority Data
Mar. 8, 2021 (FR) ...................................... 2102185

(51) Int. Cl.
*F02C 7/224* (2006.01)
*B64D 37/34* (2006.01)

(52) U.S. Cl.
CPC .............. *B64D 37/34* (2013.01); *F02C 7/224* (2013.01); *F05D 2220/62* (2013.01); *F05D 2220/76* (2013.01)

(58) Field of Classification Search
CPC .................................. B64D 37/34; F02C 7/224
See application file for complete search history.

(56) References Cited

U.S. PATENT DOCUMENTS 6,059,560 A * 5/2000 Richards ................. F23D 14/74
431/114
7,406,830 B2 * 8/2008 Valentian .................. F17C 7/04
417/313

(Continued)

FOREIGN PATENT DOCUMENTS

| EP | 1672270 | 6/2006 |
| EP | 3623604 A1 | 3/2020 |
| GB | 2240813 A | 8/1991 |

OTHER PUBLICATIONS

Search Report from the French Intellectual Property Office on corresponding FR application (FR2102185) dated Nov. 12, 2021.

(Continued)

*Primary Examiner* — Lorne E Meade
(74) *Attorney, Agent, or Firm* — Alumen IP Law PC (57) ABSTRACT

Disclosed is a fuel conditioning system (SC) configured to supply an aircraft turbine engine using fuel (Q) from a cryogenic tank (RC), the conditioning system (SC) comprising at least one pumping turbomachine (1), a first heat exchanger (31) configured to heat the fuel (Q) in the fuel circuit (CQ) by circulating an air stream (A), and at least one heating turbomachine (2) configured to supply an air flow (A) to the first heat exchanger (31), the heating turbomachine (2) comprising an air intake compressor (21), a combustion chamber (24) and an air exhaust turbine (22) configured to drive the air intake compressor (21), the combustion chamber (24) being supplied with air taken from the air flow (A) and with the fuel (Q) from the fuel circuit (CQ).

14 Claims, 4 Drawing Sheets

(56) References Cited

U.S. PATENT DOCUMENTS

| | | | | |
|---|---|---|---|---|
| 8,099,942 B2* | 1/2012 | Alexander | ............... | F02C 7/228 |
| | | | | 60/39.463 |
| 8,220,268 B2* | 7/2012 | Callas | ........................ | F02C 3/22 |
| | | | | 60/39.511 |
| 10,737,800 B2* | 8/2020 | Massie | ................ | B01D 53/8668 |
| 10,989,117 B2* | 4/2021 | Roberge | ..................... | F02C 3/22 |
| 2006/0222523 A1* | 10/2006 | Valentian | ................... | F17C 7/04 |
| | | | | 417/313 |
| 2011/0115227 A1* | 5/2011 | Shafer | ...................... | F02K 3/115 |
| | | | | 290/52 |
| 2014/0165584 A1 | 6/2014 | Foege | | |
| 2020/0088098 A1* | 3/2020 | Roberge | .................... | F02C 7/16 |

OTHER PUBLICATIONS

International Search Report and Written Opinion on corresponding PCT application (PCT/EP2022/054594) from International Searching Authority (EPO) dated May 4, 2022.

* cited by examiner

FIG. 1

PRIOR ART

FIG. 2

PRIOR ART

FUEL CONDITIONING SYSTEM AND METHOD CONFIGURED TO POWER AN AIRCRAFT TURBINE ENGINE USING FUEL FROM A CRYOGENIC TANK

TECHNICAL FIELD

The present invention relates to the field of aircraft comprising turbine engines supplied by fuel stored in a cryogenic tank.

It is known to store fuel, in particular hydrogen, in liquid form to limit the size and mass of the tanks of the aircraft. For example, the fuel is stored at a temperature of about 20 to 22 Kelvin (−253 to −251° C.) in a cryogenic tank of the aircraft.

In order to be injected into the combustion chamber of a turbine engine, the fuel must be pumped and heated in order to achieve optimum combustion. Such a heating step is necessary, for example, to reduce the risk of icing of the water vapor contained in the air circulating in the turbine engine, in particular, at the turbine engine fuel injectors.

In practice, the fuel heating step is energy-intensive and requires calories to be taken from hot sources of the aircraft. For example, the heat generated by the turbine engine may be used (heat from lubricating oil, calories from the turbine outlet, heat from the nozzle, etc.). Heat from the aircraft may also be used (air from the cabin, heat from electrical or electronic systems, etc.).

One of the problems is to optimize fuel heating while taking advantage of the cooling properties of the fuel when it is transported from the cryogenic tank to the turbine engine combustion chamber while guaranteeing high safety.

Figure 1:
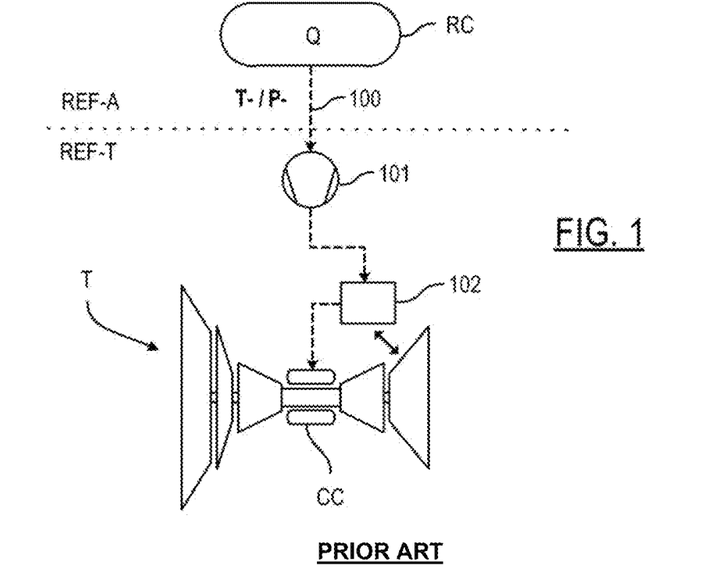
FIG. 1 is a schematic representation of a first architecture for conditioning fuel from a cryogenic tank to a turbine engine according to the prior art.
Figure 2:
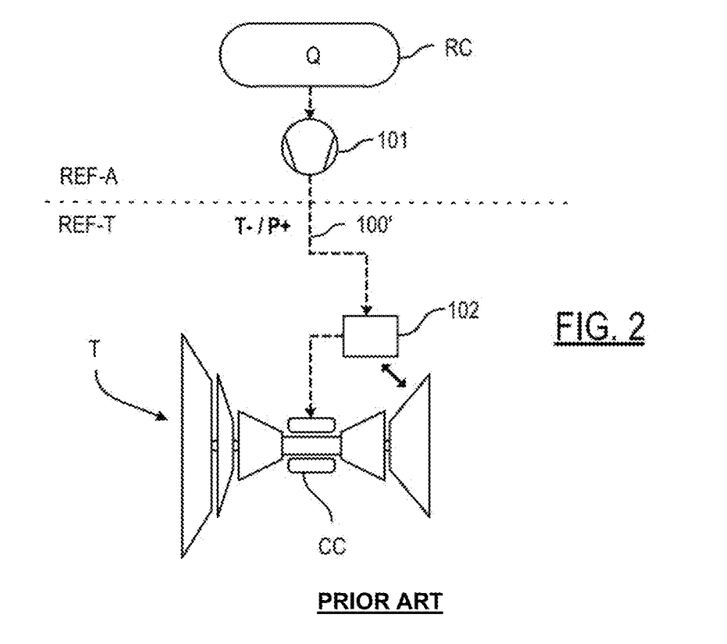
FIG. 2 is a schematic representation of a second architecture for conditioning fuel from a cryogenic tank to a turbine engine according to the prior art.

In the prior art, in reference to FIGS. 1 and 2, several architectures have been proposed to conduct fuel Q from a cryogenic tank RC to the combustion chamber CC of a turbine engine T. In a known manner, the cryogenic tank RC belongs to the aircraft referential REF-A while the combustion chamber CC belongs to the turbine engine referential REF-T.

Subsequently, the terms "upstream" and "downstream" are defined in relation to the direction of circulation of the fuel Q from the cryogenic tank RC to the combustion chamber CC.

In reference to FIG. 1, showing a first architecture, it has been proposed to successively provide, from upstream to downstream, a pump 101, belonging to the turbine engine referential REF-T, and a heat exchanger 102 taking calories from the turbine engine T, in particular, at the nozzle of the turbine engine T before injecting fuel Q into the combustion chamber CC. The pump 101 is connected to the cryogenic tank RC by a carrier pipe 100 which provides the interface between the two referentials REF-A, REF-T.

Such a first architecture has several disadvantages. Firstly, the fuel Q is carried with low pressure and low temperature through the carrier pipe 100 to the pump 101, which must therefore be thermally insulated, which has disadvantages. In addition, the presence of a heat exchanger 102 in the nozzle of the turbine engine T impacts the performance of the turbine engine T. In addition, during the transitional phases (start/stop), the length of the carrier pipes 100 entails the risk of significant thermo-fluidic instabilities, which imposes substantial durations of cooling or re-cooling detrimental to the safety and operability of the turbine engine T.

In reference to FIG. 2 showing a second architecture, it has been proposed to offset pump 101 as close as possible to the cryogenic tank RC, i.e. in the aircraft referential REF-A in order to reduce the size in the turbine engine referential REF-T. The fuel Q is compressed with high pressure and low temperature in a carrier pipe 100' connecting the pump 101 to the exchanger 102. Similar to the above, the carrier pipe 100' must be thermally insulated but also mechanically reinforced to withstand the high pressure of the fuel Q.

In both architectures, due to the very low temperature of the fuel Q in the carrier pipes 100, 100', only helium may be used as a scavenging or conditioning gas in case of fuel leakage Q. Helium must be avoided for commercial aeronautical application as this fluid is a rare gas with high cost. In the prior art of patent application EP3623604A1 a military propulsive turbomachine is known intended to operate at very high speed that comprises a heat exchanger configured to extract calories from the exhaust so as to provide them to a fuel flow.

The invention thus aims to eliminate at least some of these disadvantages by proposing a new fuel conditioning system.

SUMMARY

The invention relates to a fuel conditioning system configured to supply an aircraft turbine engine using fuel from a cryogenic tank, the conditioning system comprising:
  at least one pumping turbomachine, comprising a pump and a turbine configured to drive the pump, said pump being configured to take fuel from the cryogenic tank and circulate it from upstream to downstream in a fuel circuit comprising a supply outlet of the turbine engine, the turbine being mounted in the fuel circuit so as to allow the driving in rotation of the turbine by the circulation of the fuel,
  a first heat exchanger, mounted upstream of the turbine, configured to heat the fuel in the fuel circuit by circulating an air flow,
  at least one heating turbomachine configured to supply the first heat exchanger with an air flow, the heating turbomachine comprising an air intake compressor, a combustion chamber and an air exhaust turbine configured to drive the air intake compressor, the combustion chamber being supplied by air taken from the air flow and with fuel from the fuel circuit.

Advantageously, the use of a pumping turbomachine coupled to a heating turbomachine makes it possible to heat the fuel autonomously while consuming a small fraction of fuel. The fuel supplied at the outlet has a temperature compatible with the turbine engine, preferably a temperature close to ambient temperature and sufficient pressure to be able to be carried to the turbine engine. Thus, the conditioning system may advantageously be positioned in the aircraft referential and not in that of the turbine engine, preferably, near the cryogenic tank. Advantageously, nitrogen may be used as a neutral gas for purges and scavenging, making the implementation of the conditioning system substantially easier.

The use of a first heat exchanger allows the calories from the heating turbomachine to be transferred to the fuel for optimum heating. Advantageously, the pumping turbomachine is driven by the circulation of fuel in the fuel circuit, which makes it possible to simplify the design of the pumping turbomachine, by allowing a low fuel leak between the pump and the turbine, and increases safety.

Preferably, the combustion chamber is supplied with air taken from the air flow and with fuel from the fuel circuit and taken downstream of the turbine. The fuel advantageously has an optimum temperature and pressure for the combustion chamber.

Preferably, the system comprises a second heat exchanger configured to heat the fuel in the fuel circuit by circulating an air intake flow from the heating turbomachine. Thus, the intake air, which circulates at a lower temperature than the exhaust air, makes it possible to preheat the fuel before it is heated by the first heat exchanger. Such preheating makes it possible on the one hand to reduce the risk of condensation of the hot gasses passing through the first exchanger, and on the other hand to reduce the consumption of the air intake compressor of the heating turbomachine.

According to one aspect of the invention, the system comprises an auxiliary heat exchanger configured to heat the fuel in an upstream portion of the fuel circuit by circulating fuel downstream of the turbine. In an advantageous way, an exchange of calories by circulating fuel having different temperatures allows a gradual preheating to be carried out. Such preheating makes it possible to reduce the risk of air condensation in the following exchangers.

According to one aspect of the invention, the system comprises an electrical generator configured to be driven by the heating turbomachine. According to one aspect, the electrical generator is driven by a free turbine configured to be driven by an air flow from the heating turbomachine. Thus, the pumping turbomachine makes it possible to generate an air flow for the first heat exchanger that is used by the auxiliary turbine to produce electricity. The conditioning system thus produces electricity to contribute to its autonomy.

In another aspect, the electrical generator is driven directly by the heating turbomachine or via a gear train.

Preferably, the heating turbomachine is configured to implement a Brayton cycle so as to generate significant heat by combustion of a fraction of the fuel.

Preferably, the pumping turbomachine is immersed entirely in the fuel. This thus eliminates the need for a tight seal between the pump and the turbine. Advantageously, fluid bearing guidance may be implemented in a practical way.

Preferably, the pumping turbomachine is an expanding hydrogen turbopump in order to be driven by the circulation of fuel when it is hydrogen.

The invention also relates to an assembly of at least one cryogenic tank, an aircraft turbine engine, and a conditioning system, such as presented previously, fluidically connecting the cryogenic tank and the aircraft turbine engine.

Preferably, the conditioning system is positioned near the cryogenic tank and connected to the turbine engine by at least one circulation line that circulates fuel at ambient temperature. Such a line advantageously has a simple structure that does not require any particular thermal insulation or cooling.

According to one aspect, the conditioning system is supplied with air by a flow of air outside the turbine engine. According to another aspect, the conditioning system is supplied with air by a flow of air from the turbine engine, in particular, from a compressor of the turbine engine.

Preferably, the assembly comprises at least one fuel buffer storage capacity configured to be supplied by the conditioning system and configured to supply the aircraft turbine engine.

Preferably, the fuel buffer storage capacity is configured to store fuel at high pressure and ambient temperature. Thus, the fuel of a buffer storage capacity may be used directly by a turbine engine and reacts quickly to the requirements of the turbine engine.

The invention also relates to a method for conditioning fuel by means of a conditioning system, such as presented previously, to supply an aircraft turbine engine from fuel from a cryogenic tank, a method wherein:
   the pump of the pumping turbomachine takes fuel from the cryogenic tank and circulates it from upstream to downstream in a fuel circuit,
   the fuel is heated in the fuel circuit by the first heat exchanger by circulating an air flow from the heating turbomachine,
   the circulation of fuel in the fuel circuit driving the turbine of the pumping turbomachine in rotation,
   the combustion chamber of the heating turbomachine being supplied with air taken from the air flow and with fuel from the fuel circuit.

BRIEF DESCRIPTION OF THE DRAWINGS

The invention will be better understood upon reading the following description, given as an example, and in reference to the following figures, given as non-limiting examples, wherein identical references are given to similar objects.

Note that the figures set out the invention in detail in order to implement the invention, said figures may of course be used to better define the invention where applicable.

DETAILED DESCRIPTION OF THE INVENTION

Figure 3:
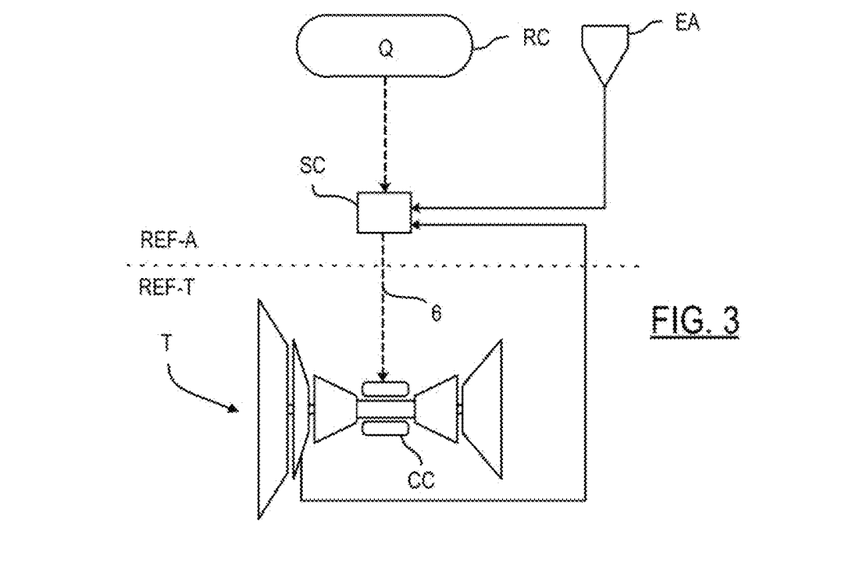
FIG. 3 is a schematic representation of an architecture for conditioning fuel from a cryogenic tank to a turbine engine with a conditioning system according to the invention.

In reference to FIG. 3, an architecture is shown according to one embodiment of the invention for carrying fuel Q from a cryogenic tank RC to the combustion chamber CC of a turbine engine T of an aircraft. In a known manner, the cryogenic tank RC belongs to the aircraft referential REF-A while the combustion chamber CC belongs to the turbine engine referential REF-T.

In this example, the fuel is liquid hydrogen but the invention applies to other types of fuel, for example, liquid methane or liquefied natural gas.

According to the invention, a fuel conditioning system SC is provided configured to supply the combustion chamber CC of the turbine engine T with liquid phase fuel from the cryogenic tank RC. The conditioning system SC belongs to the aircraft referential REF-A and allows fuel Q to be pumped as close as possible to the cryogenic tank RC. This thus reduces the space required in the turbine engine referential REF-T. As will be presented later, the conditioning system SC allows the fuel to be heated to an optimum temperature by circulating an air flow from an air inlet EA. The fuel conditioning system SC is connected to the turbine engine T via a circulation pipe 6.

Figure 4:
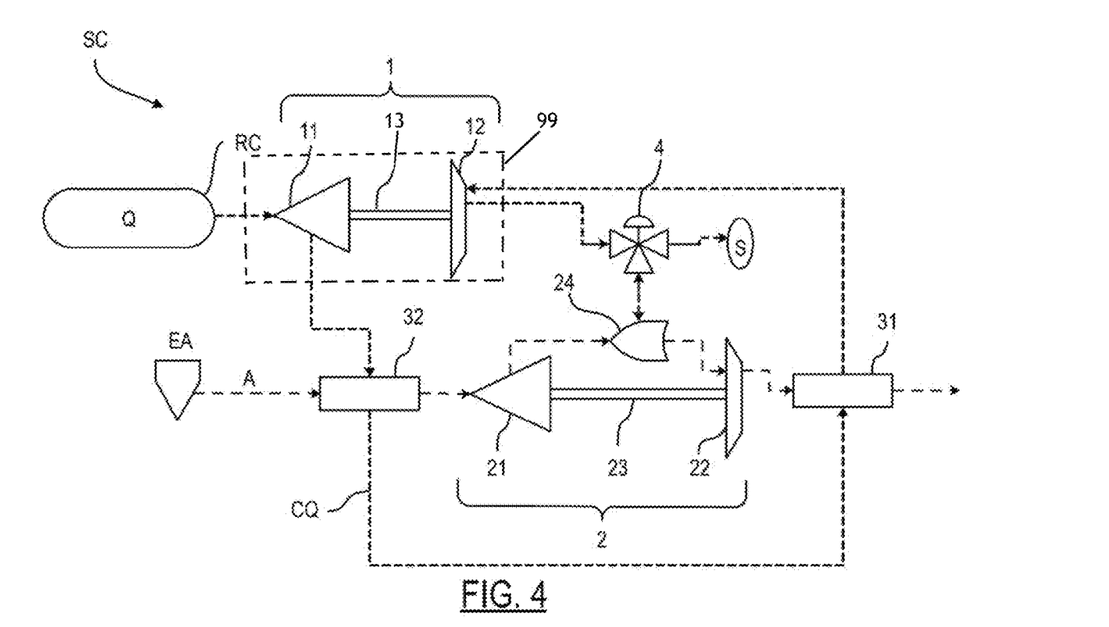
FIG. 4 is a schematic representation of a first embodiment of the conditioning system.

In reference to FIG. 4, the conditioning system SC comprises a pumping turbomachine 1, a fuel circuit CQ, a heating turbomachine 2, a first heat exchanger 31 and a second heat exchanger 32.

As shown in FIG. 4, a pumping turbomachine 1 (also called a turbopump) is shown, comprising a pump 11 and a turbine 12 configured to drive the pump 11, the pump 11 being configured to take fuel Q from the cryogenic tank RC and circulate it from upstream to downstream in the fuel circuit CQ. In this example, the pump 11 and the turbine 12 are integrally connected in rotation by a shaft 13.

The fuel circuit QC (in dashes close up in FIG. 4) thus comprises an inlet configured to be fluidly connected to the cryogenic tank RC and a supply outlet S of the turbine engine T.

The turbine 12 is mounted in the fuel circuit QC so as to be driven in rotation by the circulation of fuel Q. In other words, the pump 11 makes it possible to increase the fuel pressure Q in the fuel circuit CQ downstream of the pump 11. This pressure makes it possible to drive the turbine 12.

The pumping turbomachine 1 is preferably in the form of an expanding hydrogen turbopump. Advantageously, the turbine 12 and the pump 11 are entirely immersed in the fuel, shown schematically as element 99 in FIG. 4, in particular pure hydrogen, which reduces the dynamic sealing problems associated with the drive, in particular, as may be the case with an electric motor drive. Any leakage from the pump 11 may be re-injected into the turbine 12, upstream or downstream of the latter. The guiding in rotation may advantageously be ensured by fluid bearings guaranteeing optimum service life without the need for lubrication.

As shown in FIG. 4, a heating turbomachine 2 is shown configured to take an air flow A at an air inlet EA, preferably outside the aircraft or in the turbine engine T, and to supply the first heat exchanger 31. For example, the air inlet EA may correspond to air taken at a compressor of the turbine engine T.

The heating turbomachine 2 comprises an air intake compressor 21, a combustion chamber 24 and an air exhaust turbine 22 configured to drive the air intake compressor 21.

In this example, the air intake compressor 21 and the air exhaust turbine 22 are integrally connected in rotation by a shaft 23. The heating turbomachine 2 allows an air flow A to be taken upstream to evacuate it downstream after heating.

In this embodiment, the first heat exchanger 31 is supplied with an air exhaust flow A downstream (at high temperature), while the second heat exchanger 32 is supplied with an air intake flow A upstream (at a temperature lower than that of the exhaust). Preferably, the second heat exchanger 32 is positioned upstream of the first heat exchanger 31 on the fuel circuit CQ. Thus, the second heat exchanger 32 performs a preheating function in relation to the first heat exchanger 31 which provides the primary heating. Such an arrangement makes it possible to optimize the heating efficiency and to prevent condensation and/or icing of the water in the air in contact with the fuel Q in the first heat exchanger 31. Thus, the S outlet of the fuel circuit CQ is supplied with fuel at the optimum temperature.

According to the invention, the combustion chamber 24 is supplied by air taken from the air flow A and with fuel Q from the fuel circuit CQ and taken downstream of the turbine 12. Thus, the combustion chamber 24 of the heating turbomachine 2 is supplied with fuel Q at the optimum temperature and at the optimum pressure.

The heating turbomachine 2 preferably has the form of a Brayton cycle turbomachine and allows a hot air flow to be generated in order to provide calories to the fuel Q.

Still in reference to FIG. 4, the conditioning system SC comprises a bifurcation member 4, comprising for example a 3-way valve, configured to receive at the inlet fuel Q from the turbine 12 and to supply, on the one hand, the combustion chamber 24 of the heating turbomachine 2 and, on the other hand, the supply outlet S of the turbine engine T.

Figure 5:
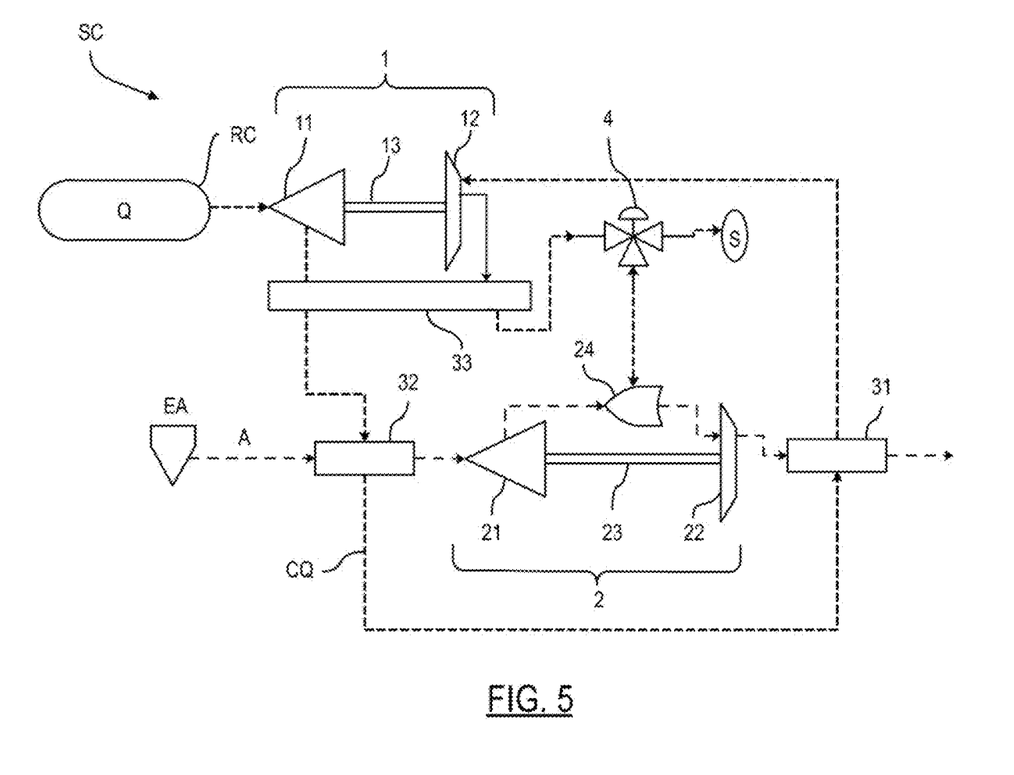
FIG. 5 is a schematic representation of a second embodiment of the conditioning system.

According to an optional aspect, in reference to FIG. 5, the conditioning system SC further comprises an auxiliary heat exchanger 33 configured to heat the fuel Q in an upstream portion of the fuel circuit CQ by circulating fuel Q circulating downstream of the turbine 12. Preferably, the auxiliary heat exchanger 33 is positioned near the pumping turbomachine 1. The auxiliary heat exchanger 33 of the fuel/fuel type allows gradual heating of the fuel at the outlet of the cryogenic tank RC. This makes it possible to prevent condensation and/or icing of the water in the air in contact with the fuel Q in the second heat exchanger 32 and/or the first heat exchanger 31.

It goes without saying that at least one heat exchanger could be positioned upstream of the turbine 12 or upstream of the first heat exchanger 31 to provide calories from heat sources from the aircraft and/or the turbine engine T.

Figure 6:
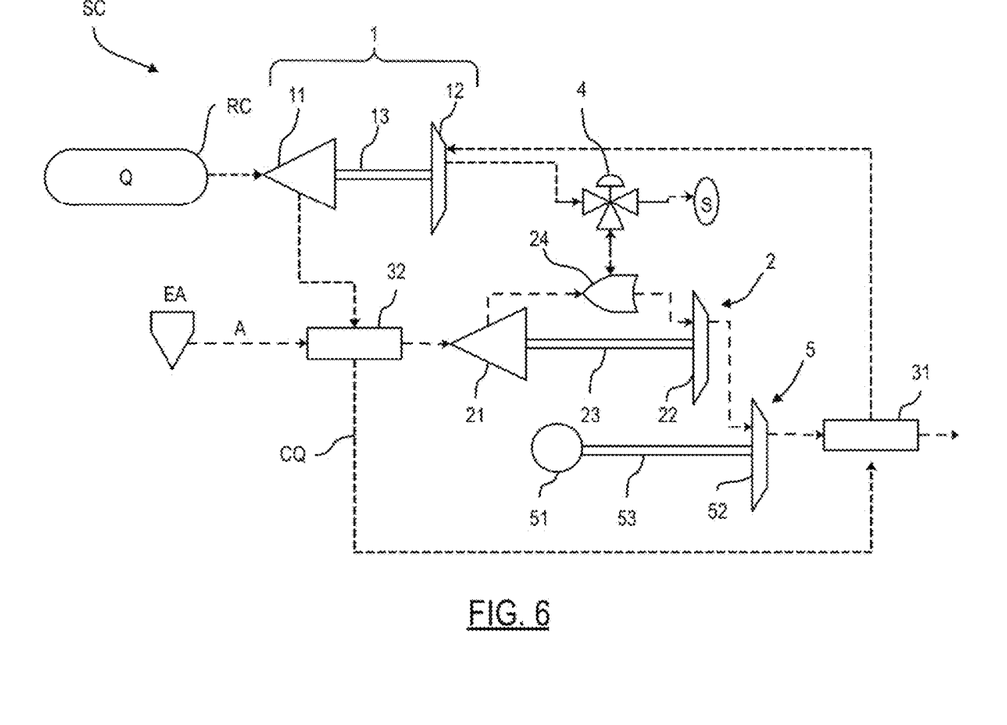
FIG. 6 is a schematic representation of a third embodiment of the conditioning system.

According to an optional aspect, in reference to FIG. 6, the conditioning system SC further comprises an electrical generator 51 driven by a free turbine 52 configured to be driven by an air flow A from the heating turbomachine 2. In this example, the electrical generator 51 is driven by the free turbine 52 via a shaft 53. The rotation of the free turbine 52 advantageously makes it possible to generate electrical energy to supply electrical energy, for example, to the non-propulsive functions of the aircraft, which makes it possible to limit mechanical takings from the turbine engine.

According to another aspect of the invention, the electrical generator 51 may be coupled to the heating turbomachine 2, in particular, directly or via a gear train (not shown).

A method for conditioning fuel by means of a conditioning system SC according to the invention shall now be presented in reference to FIG. 4.

During the method, the pump 11 of the pumping turbomachine 1 takes fuel from the cryogenic tank RC and circulates from upstream to downstream in a fuel system QC. During pumping, the pressure of the fuel Q rises.

Advantageously, the circulation of the fuel Q in the fuel circuit CQ drives the turbine 12 of the pumping turbomachine 1 in rotation, which makes it possible to use the enthalpy of the fuel Q to generate a movement. In addition, following the driving, the pressure of the fuel Q is optimal for supplying a combustion chamber, namely, that of the turbine engine T as well as that of the heating turbomachine 2.

In this example, the fuel Q is first heated in the fuel circuit CQ by the second heat exchanger 32 by circulating an upstream air flow A taken from the heating turbomachine 2. This air flow A makes it possible to ensure preheating. Then, the fuel Q is heated in the fuel circuit CQ by the first heat exchanger 31 by circulating a downstream air flow A from the heating turbomachine 2. The combustion chamber 24 of the heating turbomachine 2 is supplied by air taken from the air flow A and with fuel Q taken from the fuel circuit CQ and taken downstream of the turbine 12. The heating turbomachine 2 allows a Brayton cycle to be implemented to bring calories directly to the fuel circuit CQ. The temperature and pressure of the fuel Q are thus increased by the conditioning system SC in order to directly supply the turbine engine T.

In reference to FIG. 3, the positioning of the conditioning system SC in the aircraft referential REF-A reduces the size in the turbine engine referential REF-T. Such a conditioning system SC allows for a compromise between simplicity and implementation safety for the circulation pipe 6 connecting the conditioning system SC to the turbine engine T. Indeed, since the conditioning system SC makes it possible to increase the pressure and to increase the temperature of the fuel Q, it is no longer necessary to isolate the circulation pipe 6 connecting the conditioning system SC to the turbine engine T. The fuel Q is compressed and heated to a supercritical state where its implementation no longer presents any difficulty with respect to the thermofluidic instabilities inherent to cooling. Common technologies for the distribution of pressurized gas may then be advantageously implemented in place of more complex solutions required by cryogenic fluids.

Advantageously, thanks to the conditioning system SC, the conditioning of the fuel in a cryogenic tank RC and the use of fuel in the turbine engine T are decoupled, which simplifies management. Advantageously, the rotational speeds of the pumping turbomachine 1 and the heating turbomachine 2 may be independently adjusted in order to optimize the heating of the fuel Q.

Furthermore, it is advantageously no longer required to place an exchanger at the nozzle of the turbine engine T as in the prior art. The performance of the turbine engine T, in particular linked to the flow of the primary flow, is not affected.

Advantageously, nitrogen may be used as a neutral gas for purges and scavenging of the circulation pipe 6, which facilitates implementation compared to helium. Finally, the conditioning system SC enables autonomous operation by consuming a fraction of the fuel Q pumped into the cryogenic tank RC.

Figure 7:
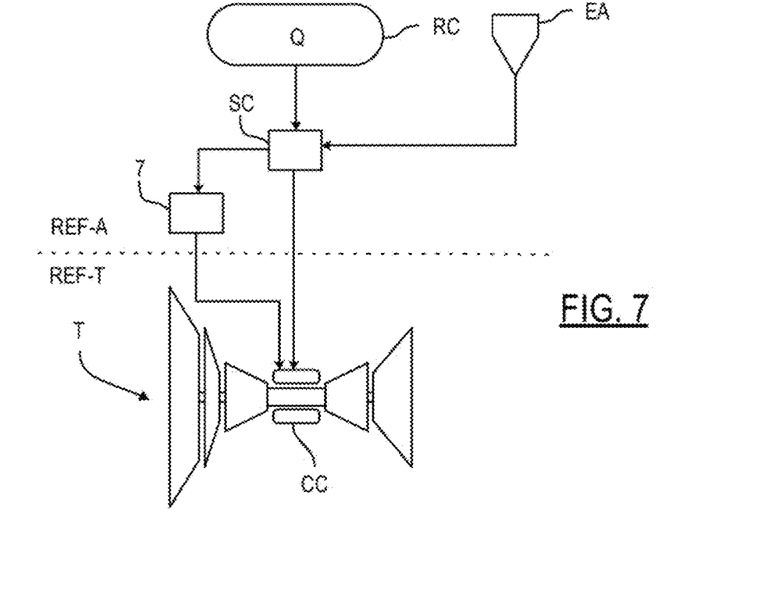
FIG. 7 is a schematic representation of a conditioning system to supply a buffer storage capacity with fuel.

According to another aspect of the invention, in reference to FIG. 7, the conditioning system SC is configured to supply one or more fuel buffer storage capacities 7, hereinafter storage capacities 7. Such storage capacities 7 make it possible to ensure a sufficient flow rate of fuel Q during the transitory phases of the turbine engine T or when the conditioning system SC does not provide a sufficient flow rate. When the fuel flow rate demand is lower, the conditioning system SC supplies the storage capacities 7. Thus, even in degraded conditions, the turbine engine T always has a fuel at high pressure and at ambient temperature ready to be used by the turbine engine T.

The invention claimed is:

1. A fuel conditioning system configured to supply an aircraft turbine engine of an aircraft with a fuel from a cryogenic tank, the fuel conditioning system being separate from the aircraft turbine engine, which has a combustion chamber, and wherein the fuel conditioning system comprising:
   at least one pumping turbomachine comprising a pump and a turbine connected to the pump to drive the pump, the pump being configured to take fuel from the cryogenic tank and circulate the fuel in a fuel circuit comprising a supply outlet for supplying the fuel, after passing through the at least one pumping turbomachine, to the aircraft turbine engine, the turbine of the at least one pumping turbomachine being mounted in the fuel circuit so as to be rotationally driven by circulation of the fuel,
   a first heat exchanger, mounted upstream of the turbine of the at least one pumping turbomachine, configured to heat the fuel in the fuel circuit by circulating an air flow across the first heat exchanger, the first heat exchanger being spaced from the aircraft turbine engine,
   at least one heating turbomachine in fluid communication with first heat exchanger to supply the first heat exchanger with the air flow, the at least one heating turbomachine comprising an air intake compressor, a combustion chamber, and an air exhaust turbine configured to drive the air intake compressor via a first shaft, the combustion chamber connected to the fuel circuit to receive fuel from the fuel circuit and connected to the air intake compressor to receive air flow from the air intake compressor, and wherein the least one heating turbomachine is spaced from the aircraft turbine engine, and
   a free turbine arranged to receive air flow from the air exhaust turbine to drive an electrical generator via a second shaft that is spaced from the first shaft, the electrical generator is configured to generate electrical energy for non-propulsive functions of the aircraft.

2. The fuel conditioning system according to claim 1, further comprising a second heat exchanger mounted in line with the fuel circuit to heat the fuel in the fuel circuit.

3. The fuel conditioning system according to claim 2, further comprising an auxiliary heat exchanger configured to heat the fuel in an upstream portion of the fuel circuit by circulating fuel circulating downstream of the turbine.

4. The fuel conditioning system according to claim 1, wherein the heating turbomachine is configured to implement a Brayton cycle.

5. The fuel conditioning system according to claim 1, wherein the pumping turbomachine is immersed entirely in the fuel.

6. The fuel conditioning system according to claim 1, wherein the pumping turbomachine is an expanding hydrogen turbopump.

7. An assembly of at least one cryogenic tank, an aircraft turbine engine, and a fuel conditioning system according to claim 1, wherein the cryogenic tank is fluidically connected to the aircraft turbine engine.

8. The assembly according to claim 7, further comprising at least one fuel buffer storage capacity configured to be supplied by the fuel conditioning system and configured to supply the aircraft turbine engine.

9. The fuel conditioning system of claim 1, wherein the supply outlet is an exit from a bifurcation member having at least interconnected flow ports.

10. The fuel conditioning system of claim 1, wherein the supply outlet is configured to connect to and be in fluid communication with the aircraft turbine engine.

11. A method of conditioning fuel by means of the conditioning system according to claim 1 to supply the aircraft turbine engine with the fuel from the cryogenic tank, method wherein:
   pumping fuel from the cryogenic tank with the pump of the turbomachine and circulating the fuel from upstream to downstream in the fuel circuit,
   heating the fuel with the first heat exchanger by circulating the air flow from the heating turbomachine across the first heating exchanger,
   driving the turbine of the pumping turbomachine with the fuel in the fuel circuit to rotate the turbine of the pumping turbomachine, and
   supplying the combustion chamber of the heating turbomachine with air taken from the air flow and with fuel from the fuel circuit.

12. A fuel conditioning system configured to supply an aircraft turbine engine with fuel from a cryogenic tank, the conditioning system comprising:
- a pumping turbomachine comprising a turbine operatively connected to a pump to drive the pump, said pump fluidly coupled to the cryogenic tank to take fuel from the cryogenic tank and to circulate the fuel from upstream to downstream in a fuel circuit, the turbine being mounted in the fuel circuit so as to be rotationally driven by circulation of the fuel;
- a first heat exchanger mounted upstream of the turbine of the pumping turbomachine to heat the fuel in the fuel circuit by circulating an air flow;
- a heating turbomachine fluidly connected to the first heat exchanger to supply the first heat exchanger with the air flow, the heating turbomachine comprising an air intake compressor, a combustion chamber, and an air exhaust turbine configured to drive the air intake compressor via a first shaft, and wherein the combustion chamber is supplied with air taken from the air flow and fuel from the fuel circuit;
- wherein a supply outlet for supplying fuel to the aircraft turbine engine is located downstream of the turbine of the pumping turbomachine and in fluid communication with the turbine of the pumping turbomachine; and
- wherein a free turbine arranged to receive air flow from the air exhaust turbine to drive an electrical generator via a second shaft that is spaced from the first shaft, the electrical generator is configured to generate electrical energy for non-propulsive functions of the aircraft.

13. The fuel conditioning system of claim 12, further comprising a second heat exchanger configured to heat the fuel in the fuel circuit by circulating an air intake flow from the heating turbomachine to preheat the fuel before the fuel is heated by the first heat exchanger.

14. The fuel conditioning system of claim 12, wherein the supply outlet is an exit from a bifurcation member having at least interconnected flow ports.

* * * * *